UNITED STATES PATENT OFFICE.

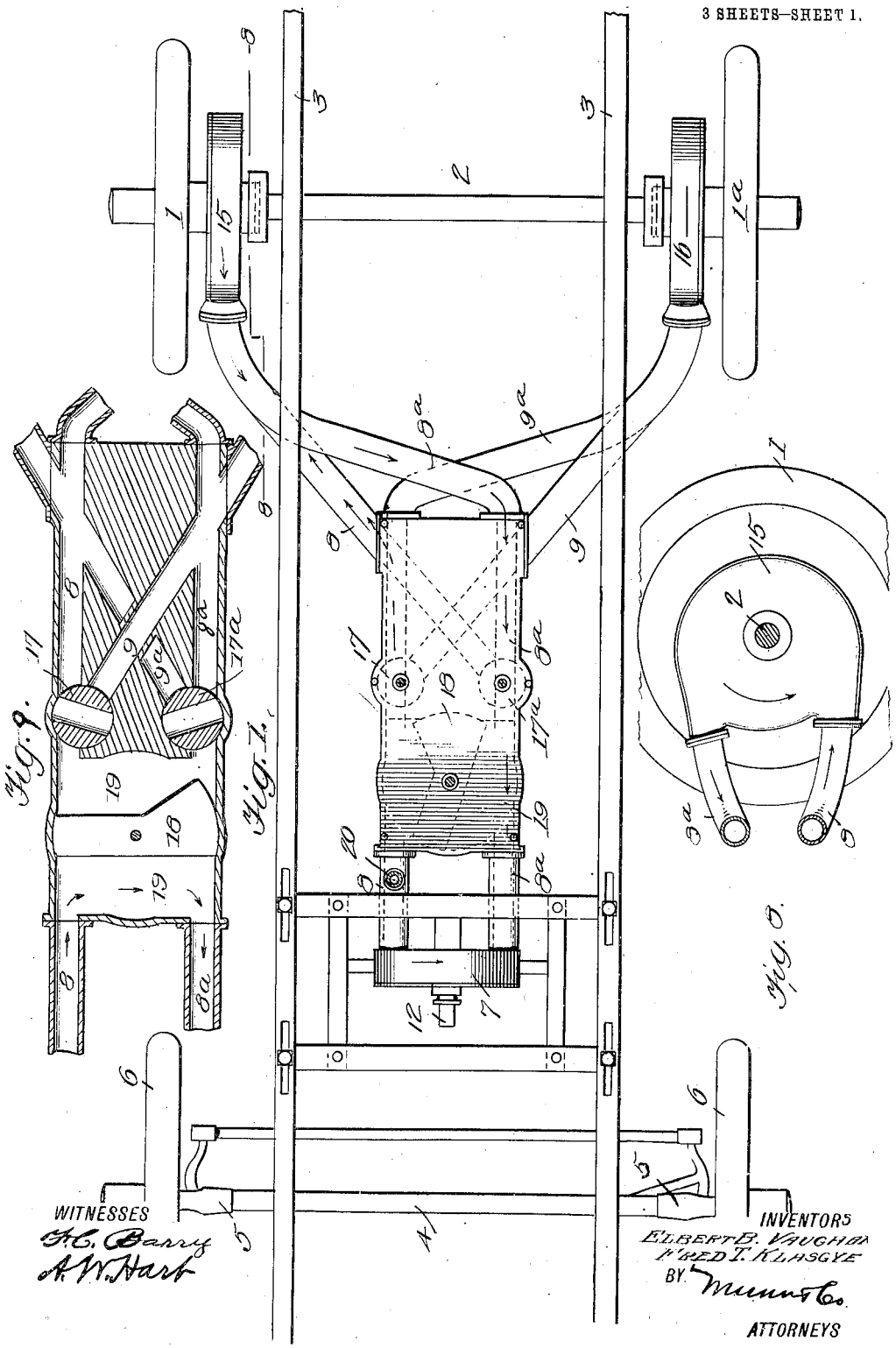

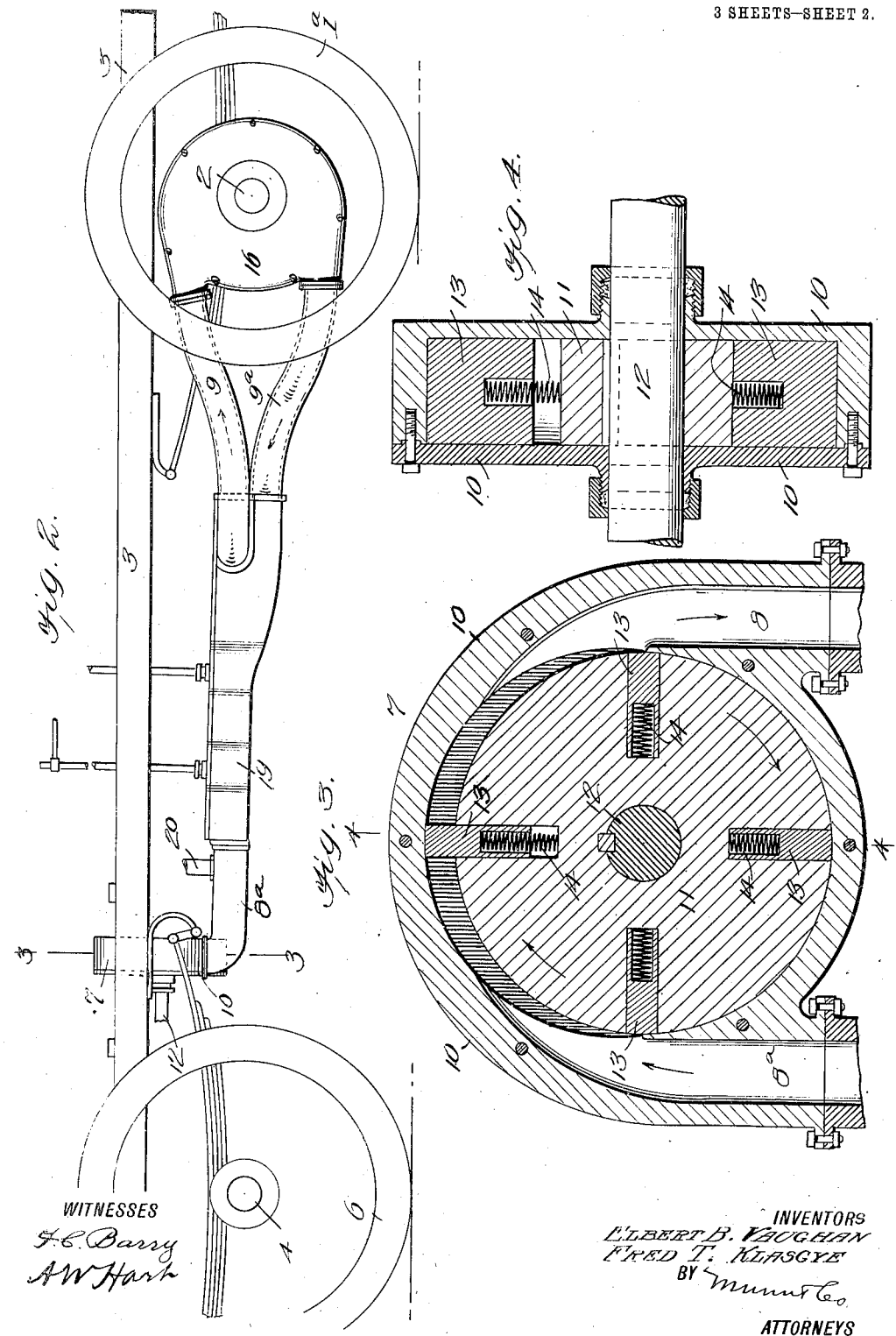

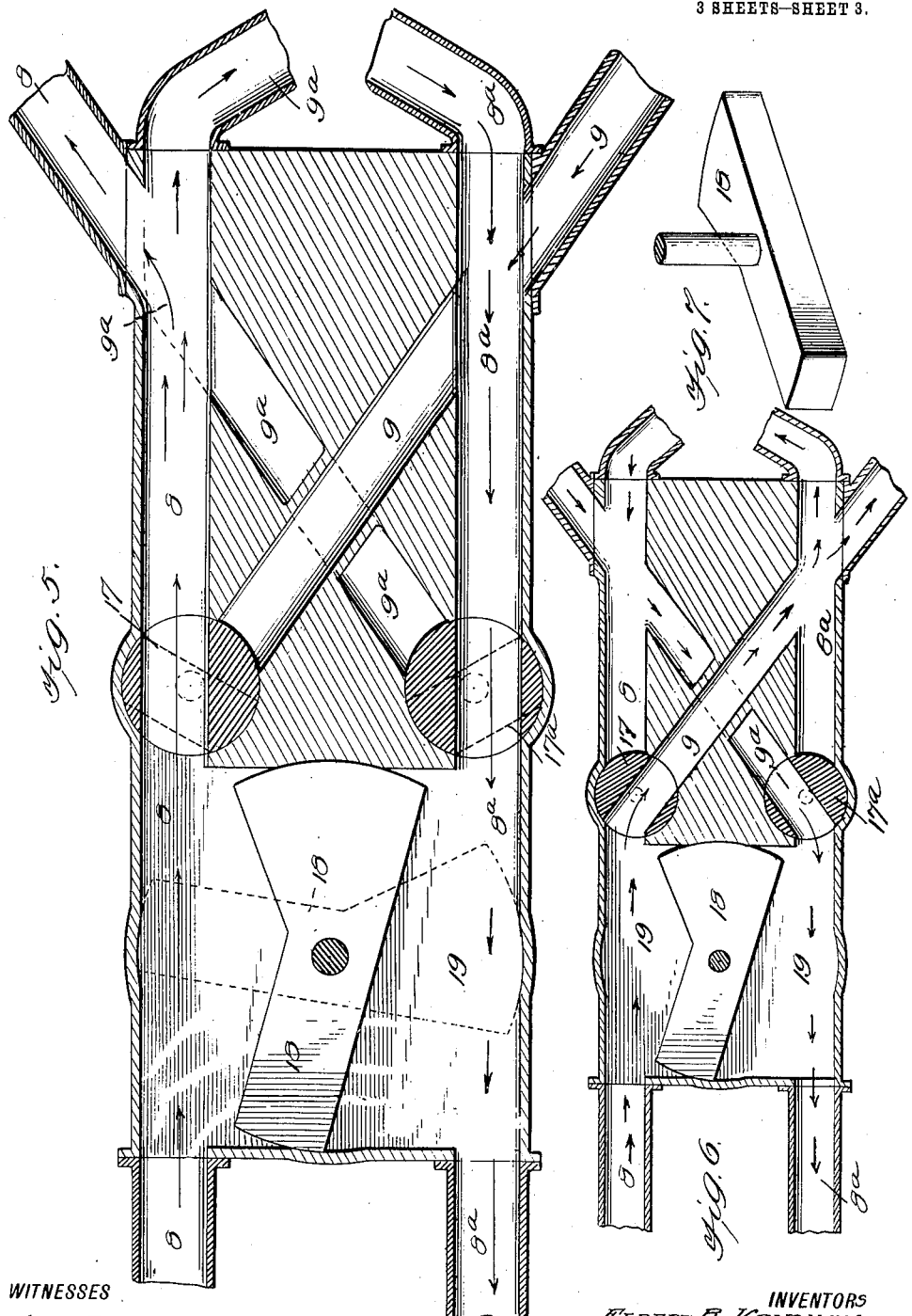

ELBERT B. VAUGHAN AND FRED T. KLASGYE, OF CLEVELAND, OHIO.

FLUID TRANSMISSION FOR MOTOR-VEHICLES.

1,056,606.  Specification of Letters Patent.  Patented Mar. 18, 1913.

Application filed May 15, 1912. Serial No. 697,365.

*To all whom it may concern:*

Be it known that we, ELBERT B. VAUGHAN and FRED T. KLASGYE, citizens of the United States, and residents of Cleveland, in the county of Cuyahoga and State of Ohio, have invented an Improvement in Fluid Transmission for Motor-Vehicles, of which the following is a specification.

The object of our invention is an improvement in motor vehicles in which a circulating liquid is substituted for gearing for transmitting power from the motor to the driving wheels. We have devised a new and advantageous construction and combination of parts for this purpose, the details of which are hereinafter described and illustrated in the accompanying drawings, in which—

Figure 1 is a diagrammatic plan view of the chassis and wheels of an automobile, together with our improvements as applied thereto. Fig. 2 is a side view of the same. Fig. 3 is an enlarged vertical section on the line 3—3 of Fig. 2. Fig. 4 is a vertical cross section on the line 4—4 of Fig. 3. Fig. 5 is an enlarged horizontal section of a portion of our improved apparatus. Fig. 6 is a similar section reduced but showing a different position of certain valves. Fig. 7 is a perspective view of the main valve regulating circulation of the motive fluid. Fig. 8 is a cross section on the line 8—8 of Fig. 1. Fig. 9 is a horizontal section showing the position of valves for cutting off circulation through the motors.

Referring in the first instance to Figs. 1 and 2, the rear wheels 1, 1ª, are mounted on an axle 2 fixed in a chassis 3 and having stub journals to which the rear running wheels 1ª are applied. Motors 15 and 16 are attached to the hubs of said wheels and act independently of each other but both work alike, both taking the fluid at the under side in forward motion and at the top when reversing. Both motors are used to propel for reversing the vehicle.

At the front of the apparatus there is arranged vertically a motor 7 of the turbine type from which pipes 8 and 8ª lead rearward, as shown. This turbine comprises a cylindrical casing 10—see Figs. 3 and 4—and a rotary disk 11 keyed upon a horizontal shaft 12 and provided with a series of radial equidistant pistons 13, which are pressed outward by springs 14 and whose outer ends work in frictional contact with the casing. The direction of rotation is clockwise, or from left to right, as indicated by arrows in Fig. 3. The shaft 12 of this motor projects forward, and, in practice, is connected with a gasolene or other driving motor (not shown).

On the rear wheels 1ª are arranged two turbines 15 and 16, which are similar in construction to the propelling motor already described. The pipe 8 leading from the casing of the propelling motor extends to, and connects with, the lower side of the driving turbines 15 and 16, and a return pipe 8ª leads from said turbines crosswise, as shown in Fig. 1, and extends back to the propelling motor 7. As shown in Fig. 8, the pipe 8 is connected with the lower side of the turbines 15 and 16 and the pipe 8ª is similarly connected with the upper side of the same. It will thus be apparent that when the propelling motor 7 is rotated to the right—see Fig. 3—the liquid, say oil, which is contained in the system, will flow along pipe 8 to the lower side of the motors 15 and 16 and, passing around the same, will return by the pipe 8ª to the propelling motor 7. Thus the vehicle is propelled by turbines 15 and 16. Rotary valves 17 and 17ª shown in Figs. 5 and 6, are arranged in connection with the outflow and return pipes 8, 8ª, in such manner, that when adjusted as in Fig. 5, they permit the free flow of liquid outward and inward; but, when adjusted at the angle shown in Fig. 6, they cut off the flow from pipes 8, 8ª, and direct the same to and from rear turbines 15 and 16. With this position of the valves, it will be seen that the liquid flows from pipe 8 into a cross-pipe 9 and is thus conveyed to the upper side of the turbines 15 and 16, and that it returns by way of the cross-pipe 9ª to the pipe 8ª and thus back to the propelling turbine 7. It will be understood that while, in the case of the propelling turbines 15 and 16, the inflow of liquid is at the bottom and the outflow from the top, as indicated by arrows in Fig. 8, in the case of the reversing turbines 15 and 16, the opposite arrangement is required, the inflow being at the top and the outflow at the bottom.

It is to be understood that we shall employ any suitable means for shifting, that is to say, rotating, the reversing valves 17, 17ª, and we do not deem it necessary to describe any particular means for the purpose, since this is within the skill of the ordinary mechanic.

Between the propelling motor 7 and the reversing valves 17, 17ª, there is arranged, as shown in Figs. 5 and 6, a speed-regulating valve 18, the same being arranged in a circular chamber 19 which is extended laterally into the opposite pipes 8, 8ª. When the valve is adjusted as shown by full lines in Figs. 5 and 6, that is to say, practically parallel to the pipes 8, 8ª, liquid flows through the pipe 8 and returns by pipe 8ª; but when the valve is placed crosswise, as shown in Fig. 8, the circulation of liquid through the pipes 8, 8ª, is arrested and motors 15 and 16 then constitute a brake. Again, it is apparent that the valve 18 may be adjusted to but partly cut off the flow of liquid through the pipes 8, 8ª, and by this means the speed of the vehicle may be regulated at will, it being greater when the valve is widely opened and correspondingly less when the valve is closed more or less. When the valve 18 is set crosswise as in Fig. 9, or the valves 17 and 17ª are set as there shown, the circulation of liquid through the motors 15 and 16 is arrested and the motors serve as a brake. Such slight waste of the motive liquid as may occur may be resupplied from a tank (not shown) which, in practice, will be connected at 20 with the pipe 8—see Figs. 1 and 2.

What we claim is:—

1. The improved liquid power-transmitting apparatus for motor vehicles, the same comprising a liquid circulating turbine adapted for connection with a driving engine, propelling and reversing turbines adapted to be mounted upon a reversible driving axle, outflow and return pipes connected with the circulating turbine and with the respective propelling and rotary reversing turbines, and reversing valves each applied at the junction of one of said pipes and a branch from the other, as described.

2. The improved liquid power-transmitting apparatus for motor vehicles, the same comprising a liquid circulating turbine adapted for connection with a driving engine, propelling and reversing turbines adapted to be mounted upon a reversible driving axle, outflow and return pipes and branches thereof all connected with the propelling and reversing turbines, rotary reversing valves each applied at the junction of one of said pipes and a branch from the other, and a rotary speed-regulating valve arranged between the outflow and inflow pipes and adapted for adjustment practically parallel or at right angles to both said pipes, as described, whereby the flow of liquid to the rear turbine may be entirely or partly cut off as conditions require.

3. In a motor vehicle, the combination with the rear driving axle, and propelling and reversing turbines mounted thereon, of a liquid circulating apparatus comprising a turbine adapted for operation as described, outflow and return pipes and branches thereof connected in pairs with the respective turbines at top and bottom, rotary reversing valves each applied at the junction of one of said pipes and a branch from the other, and a speed-regulating valve arranged in front of the reversing valves and adapted to cut off more or less the outflow and return flow of liquid, as described.

ELBERT B. VAUGHAN.
FRED T. KLASGYE.

Witnesses:
  J. C. HEALD,
  A. E. HEALD.